(12) United States Patent
Asakawa

(10) Patent No.: US 10,571,735 B2
(45) Date of Patent: Feb. 25, 2020

(54) DISPLAY DEVICE

(71) Applicant: Japan Display Inc., Minato-ku (JP)

(72) Inventor: Youichi Asakawa, Tokyo (JP)

(73) Assignee: Japan Display Inc., Minato-ku (JP)

(*) Notice: Subject to any disclaimer, the term of this patent is extended or adjusted under 35 U.S.C. 154(b) by 288 days.

(21) Appl. No.: 15/342,680

(22) Filed: Nov. 3, 2016

(65) Prior Publication Data

US 2017/0139269 A1 May 18, 2017

(30) Foreign Application Priority Data

Nov. 16, 2015 (JP) ................................. 2015-223844

(51) Int. Cl.
*G02F 1/1335* (2006.01)
*F21V 8/00* (2006.01)

(52) U.S. Cl.
CPC ....... *G02F 1/133514* (2013.01); *G02B 6/005* (2013.01); *G02B 6/0038* (2013.01); *G02B 6/0046* (2013.01); *G02B 6/0053* (2013.01); *G02B 6/0068* (2013.01); *G02F 1/13362* (2013.01); *G02F 1/133621* (2013.01); *G02B 6/003* (2013.01); *G02F 2001/133624* (2013.01)

(58) Field of Classification Search
CPC ........... G02F 1/13362; G02F 1/133621; G02F 1/133514; G02B 6/003; G02B 6/0053; G02B 6/0068

See application file for complete search history.

(56) References Cited

U.S. PATENT DOCUMENTS

2009/0168453 A1    7/2009   Koike et al.
2011/0116010 A1*   5/2011   Nagata .................. G02B 6/005
                                                                349/62

(Continued)

FOREIGN PATENT DOCUMENTS

CN      101285957 A    10/2008
CN      102037399 A     4/2011

(Continued)

OTHER PUBLICATIONS

Office Action and Search Report dated Jan. 28, 2019 in the corresponding Chinese Patent Application No. 201611004962.X with Unedited Computer-Generated English Translation 17 pages.

(Continued)

*Primary Examiner* — Michael H Caley
*Assistant Examiner* — Mariam Qureshi
(74) *Attorney, Agent, or Firm* — Oblon, McClelland, Maier & Neustadt, L.L.P.

(57) ABSTRACT

According to one embodiment, a display device includes a light source unit and a color filter unit. The light source unit includes a laser light source unit including a red laser light source, a green laser light source and a blue laser light source. The color filter unit includes a red filter film, a green filter film and a blue filter film. The difference between the center emission wavelength of the green laser beam and that of the blue laser beam falls within the range of 65 to 95 nm. In the green filter film, the difference between a wavelength at a maximum light transmittance and a wavelength at a light transmittance of 10% on the shorter wavelength side is 70 nm or less.

12 Claims, 12 Drawing Sheets

(56) References Cited

U.S. PATENT DOCUMENTS

| | | | |
|---|---|---|---|
| 2011/0157871 A1* | 6/2011 | Liu | G02F 1/133514 362/97.2 |
| 2013/0208215 A1* | 8/2013 | Lin | G02F 1/133621 349/71 |
| 2013/0322114 A1* | 12/2013 | Nishitani | G02B 6/0051 362/606 |
| 2015/0070624 A1* | 3/2015 | Liu | G02F 1/133514 349/61 |
| 2015/0316844 A1 | 11/2015 | Samejima et al. | |
| 2015/0338700 A1 | 11/2015 | Kimura et al. | |
| 2016/0161801 A1* | 6/2016 | Watano | G02B 5/201 349/71 |
| 2016/0360967 A1* | 12/2016 | Nishiwaki | G02B 6/34 |
| 2016/0363821 A1* | 12/2016 | Lee | G02F 1/134309 |
| 2018/0024404 A1* | 1/2018 | Suzuki | H01L 51/5268 362/84 |

FOREIGN PATENT DOCUMENTS

| | | |
|---|---|---|
| CN | 103328881 A | 9/2013 |
| CN | 103676273 A | 3/2014 |
| JP | 2004-118133 | 4/2004 |
| JP | 2009-231018 | 10/2009 |
| JP | 5263771 | 8/2013 |
| JP | 2014-6326 | 1/2014 |

OTHER PUBLICATIONS

Office Action dated Oct. 8, 2019 in Chinese Application No. 201611004962.X (w/English translation).

* cited by examiner

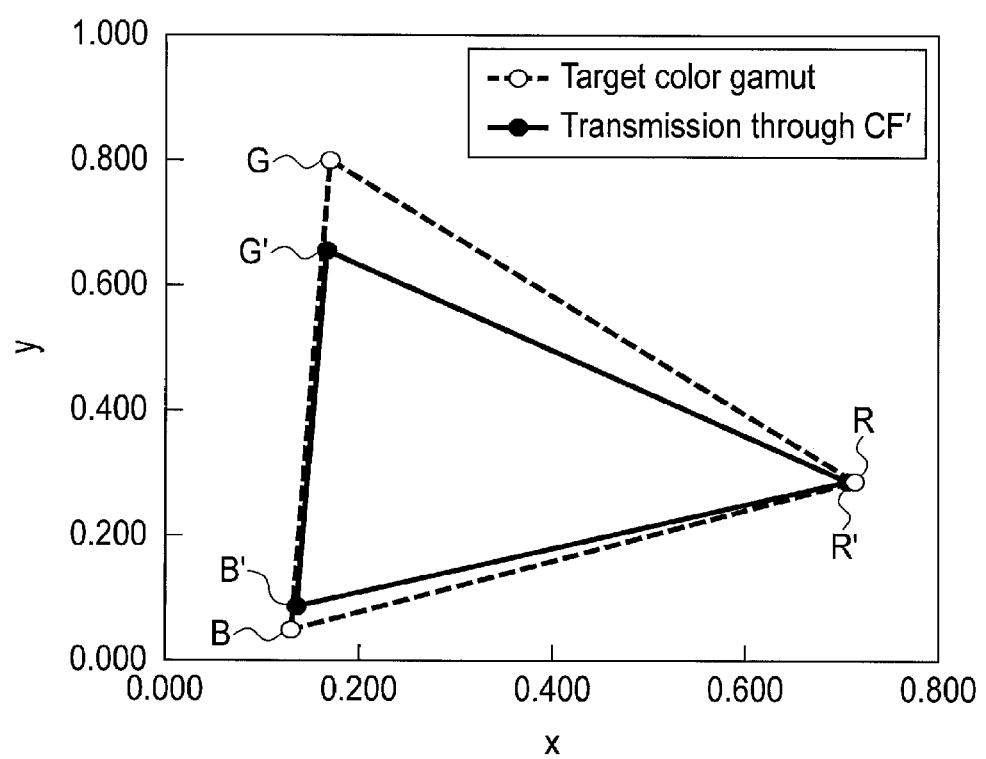
F I G. 1

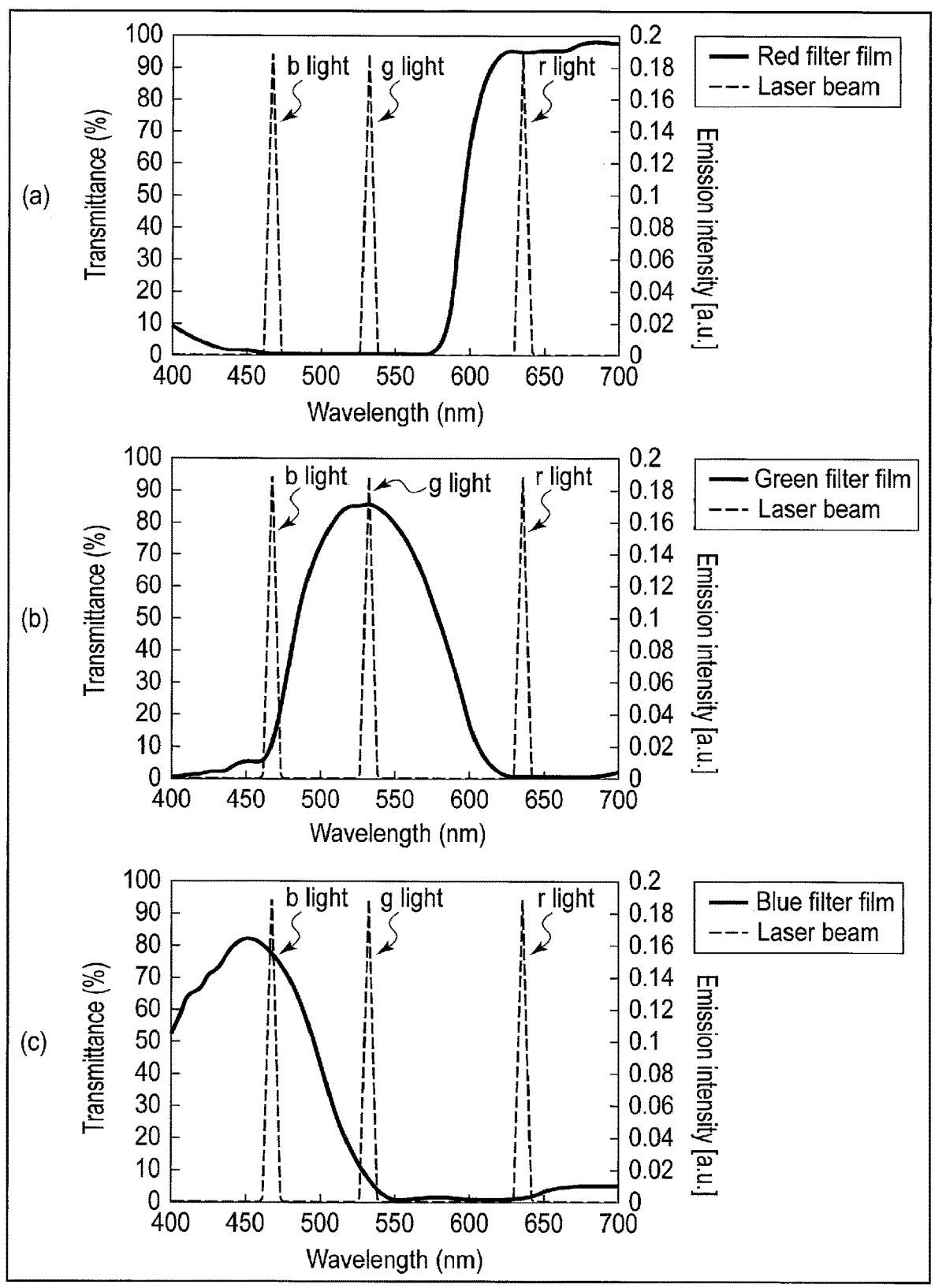
F I G. 2

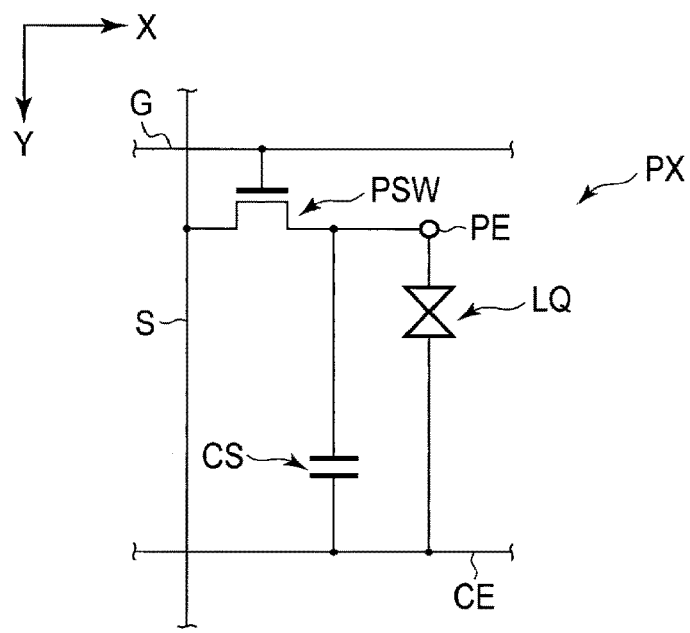
F I G. 4
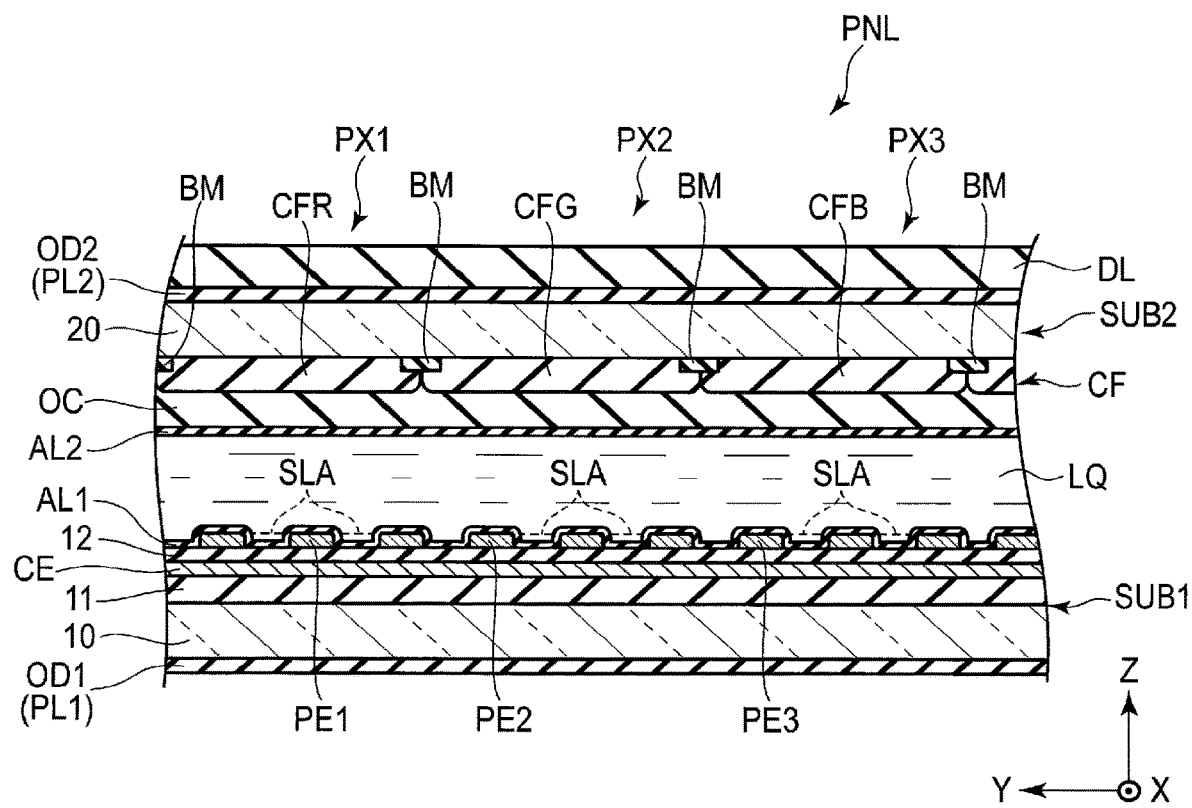
F I G. 6

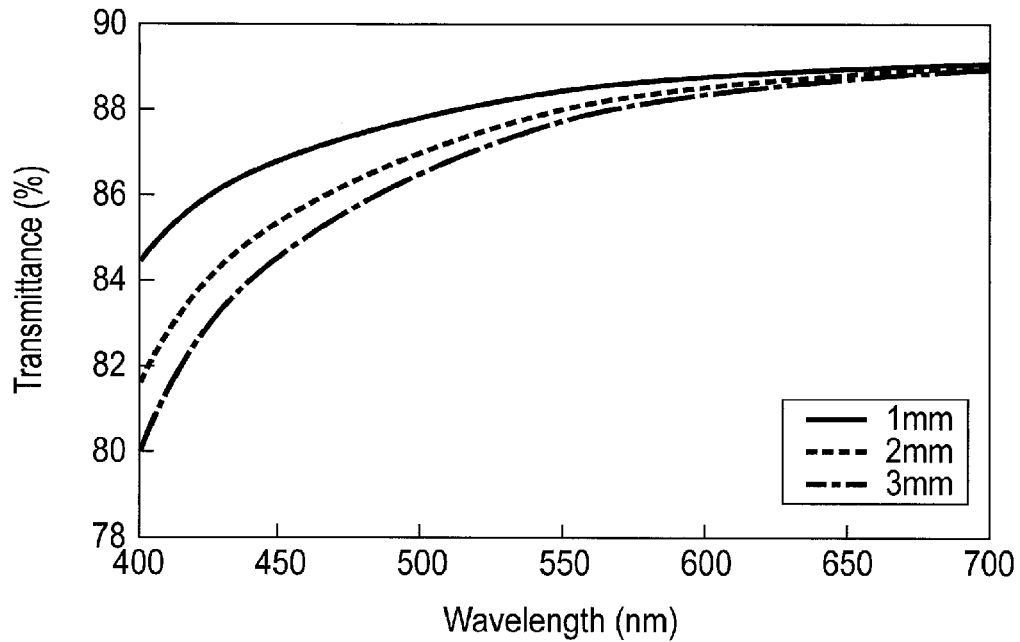
F I G. 12
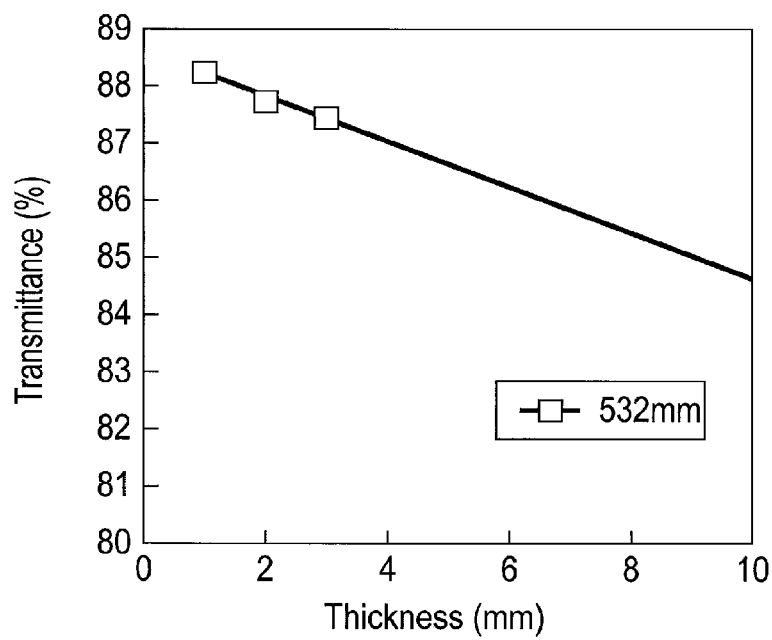
F I G. 13

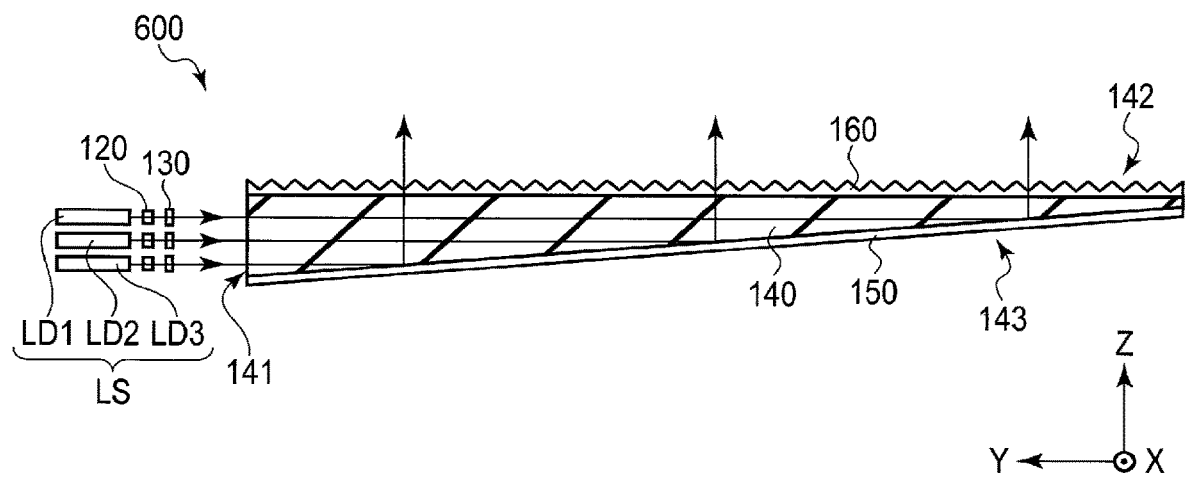
F I G. 14
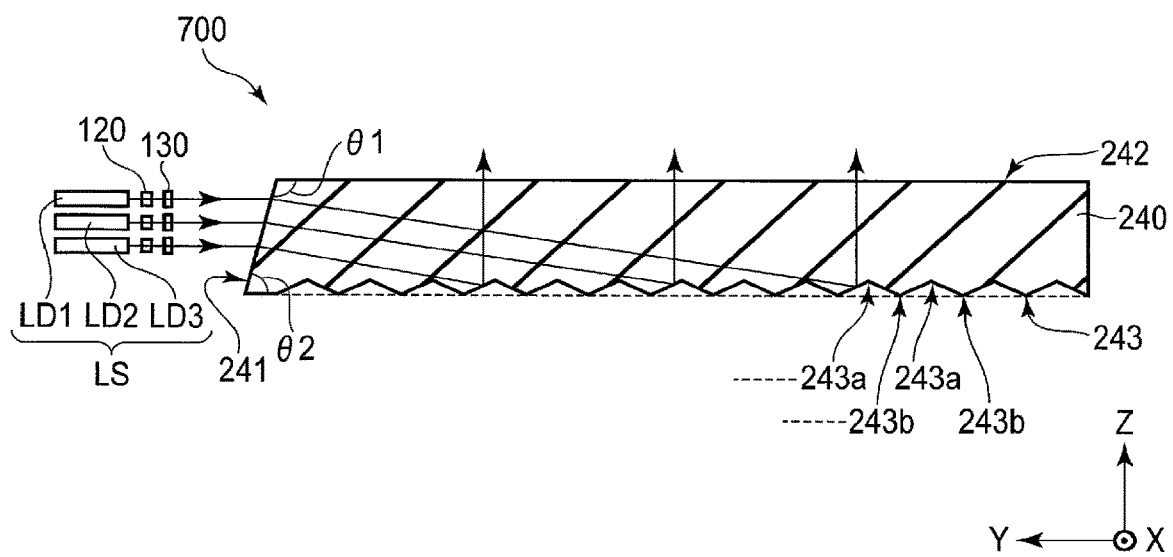
F I G. 15

DISPLAY DEVICE

CROSS-REFERENCE TO RELATED APPLICATIONS

This application is based upon and claims the benefit of priority from Japanese Patent Application No. 2015-223844, filed Nov. 16, 2015, the entire contents of which are incorporated herein by reference.

FIELD

Embodiments described herein relate generally to a display device.

BACKGROUND

In recent years, from the viewpoint of saving space and energy, display devices such as liquid crystal display devices, plasma display devices and organic electroluminescent (EL) display devices have been increasingly used. Currently, display devices are required to display an image with a higher resolution and in a wider color gamut (in a wider color reproduction range).

In future, ultra-high-definition television broadcasts will start. However, they cannot be addressed by conventional display devices provided with LED light sources having wide-band emission wavelength characteristic.

BRIEF DESCRIPTION OF THE DRAWINGS

FIG. 1 is a CIE 1931 xy chromaticity diagram.

FIG. 2 illustrates relationships (a), (b) and (c) between the emission wavelength characteristics of a red laser beam, a green laser beam and a blue laser beam as illustrated in FIG. 1 and the spectral transmittances of a red filter film, a green filter film and a blue filter film, respectively.

FIG. 4 illustrates a configuration of a pixel.

FIG. 6 is a schematic cross-sectional view of a display panel provided in the display device according to the first embodiment.

FIG. 12 is a graph illustrating a relationship between the thickness (mm) and a spectral transmittance (%) in a light-guide unit.

FIG. 13 is a graph in which the result of measurement as illustrated in FIG. 12 is plotted, the horizontal axis representing the thickness (mm) of the light-guide unit and the vertical axis representing the transmittance (%) of light having a wavelength of 532 nm.

FIG. 14 is a schematic cross-sectional view of an illumination unit provided in a display device according to a modification of the first embodiment.

FIG. 15 is a schematic cross-sectional view of an illumination unit provided in a display device according to a modification of the second embodiment.

DETAILED DESCRIPTION

Figure 3:
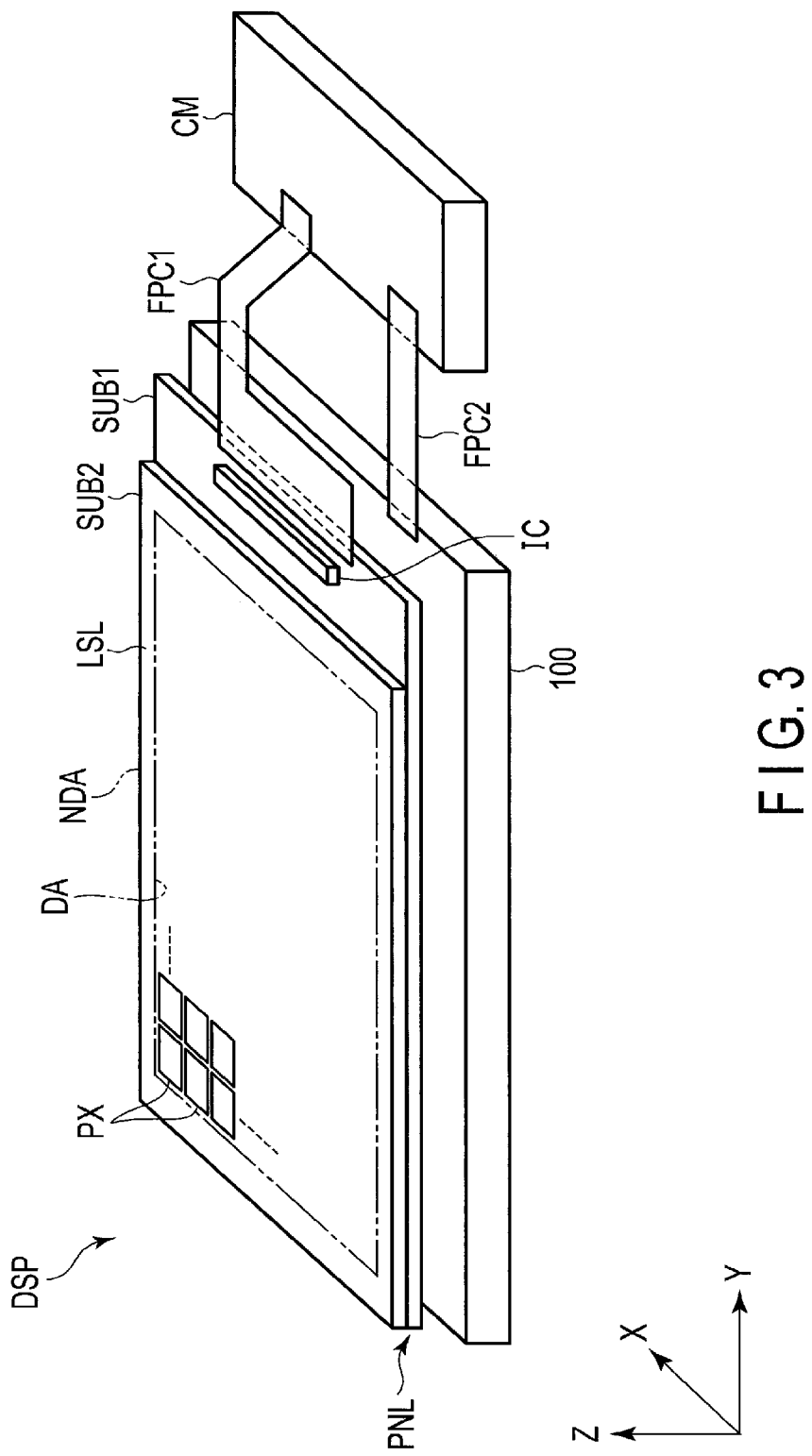
FIG. 3 is a perspective view illustrating a display device according to a first embodiment.

In general, according to one embodiment, there is provided a display device which comprises a light source unit and a color filter unit, in which light emitted from the light source unit passes through the color filter unit for performing displaying. The light source unit comprises a laser light source unit including a red laser light source which emits a red laser beam, a green laser light source which emits a green laser beam and a blue laser light source which emits a blue laser beam. The color filter unit includes a red filter film, a green filter film and a blue filter film. The difference between the center emission wavelength of the green laser beam and that of the blue laser beam falls within the range of 65 to 95 nm. In the green filter film, the difference between a wavelength at which a maximum light transmittance is exhibited and a wavelength at which a light transmittance of 10% is exhibited on the shorter wavelength side is 70 nm or less.

Embodiments will be described hereinafter with reference to the accompanying drawings.

It should be noted that the embodiments all relate to a display device including a liquid crystal display panel in which liquid crystal molecules function as optical elements; however, the present invention is not limited thereto. A display device may include a mechanical display panel in which a micro-electromechanical system (MEMS) shutter functions as an optical element. It should also be noted that if the MEMS shutter is applied, first and second polarizers to be described later need not to be provided. In the present specification and drawings, after structural elements are each explained once with reference to any of the drawings, there is a case where their explanations will be omitted as appropriate, and those identical to or similar to the explained structural elements will be denoted by the same reference numbers, respectively, as the explained structural elements.

FIG. 1 is a CIE 1931 xy chromaticity diagram. The vertical axis represents y, and the horizontal axis represents x. In FIG. 1, a chromaticity coordinate is expressed by (x, y). A triangle with points R, G and B as vertices as illustrated in FIG. 1 is an example of a target color gamut. The chromaticity coordinate of point R is (0.708, 0.292); the chromaticity coordinate of point G is (0.170, 0.797); and the chromaticity coordinate of point B is (0.131, 0.046).

Point R can be displayed by a red laser beam (hereinafter referred to as r light) which has a center emission wavelength of 630 nm and is emitted from the red laser light source (hereinafter referred to as the r light source). Point G can be displayed by a green laser beam (hereinafter referred to as g light) which has a center emission wavelength of 532 nm and is emitted from the green laser light source (hereinafter referred to as the g light source). Point B can be displayed by a blue laser beam (hereinafter referred to as b light) which has a center emission wavelength of 467 nm and is emitted from the blue laser light source (hereinafter referred to as the b light source). The half bandwidth of the intensity of each of the r light, the g light and the b light is 5 nm or less. Light having a target color gamut can be displayed by additive color mixing of emitted.

However, in a display device such as a liquid crystal display device, light emitted from a light source is transmitted through a color filter unit, etc., for displaying. In FIG. 1, points R', G' and B' shown in FIG. 1 respectively represent the chromaticity of r light, g light and b light which have been transmitted through a conventional color filter unit CF'. A triangle with points R', G' and B' as vertices represents a color gamut which can be displayed by additive color mixing of the r light, g light and b light transmitted through the conventional color filter unit CF'. Point R' representing the chromaticity of r light does not shift from point R. By contrast, point G' representing the chromaticity of g light shifts from point G toward point B. Also, point B' representing the chromaticity of b light shifts from point B toward point G. As a result, the color gamut represented by the triangle with points R', G' and B' as vertices is 75% of the target color gamut. Thus, even if a laser light source which is a light source having a narrow-band emission wavelength characteristic and high light purity is used, there is a case where the display device cannot be widened in the color gamut. The reasons will be explained below with reference to FIG. 2.

FIG. 2 graphically illustrate relationship (a), (b) and (c) between the emission wavelength characteristics of the r light, the g light and the b light as illustrated in FIG. 1 and the spectral transmittance of a red filter film, that of a green filter film and that of a blue filter film in the above conventional color filter unit CF'. As illustrated in (a) of FIG. 2, the red filter film transmits only light having a wavelength which falls within the emission wavelength range of r light. As illustrated in (b) of FIG. 2, the wavelength at which the maximum light transmittance is exhibited is 532 to 537 nm for the green filter film. Since the wavelength at which the maximum light transmittance is exhibited is equal to the center emission wavelength of the g light, i.e., 532 nm, the green filter film efficiently transmits g light. However, in the green filter film, the transmittance of light having a wavelength of 467 nm which is the center emission wavelength of b light is 11%. Thus, the green filter film transmits not only the g light, but light having a wavelength which falls within the emission wavelength range of the b light. As a result, as illustrated in FIG. 1, point G' largely shifts from point G toward point B. Furthermore, as illustrated in (c) of FIG. 2, in the blue filter film, the wavelength at which a maximum light transmittance is exhibited is 452 to 467 nm. Since the wavelength at which the maximum light transmittance is exhibited is equal to the center emission wavelength of the b light, i.e., 467 nm, the blue filter film efficiently transmits the b light. However, in the blue filter film, the transmittance of light having a wavelength of 532 nm which is the center emission wavelength of the g light is 5%. Thus, the blue filter film transmits not only the b light, but light having a wavelength which falls within the emission wavelength range of the g light. As a result, as illustrated in FIG. 1, point B' shifts from point B toward point G.

As explained above, in the conventional color filter unit CF', the green filter film transmits not only the g light, but light having a wavelength which falls within the emission wavelength range of the b light; and the blue filter film transmits not only the b light, but light having a wavelength which falls within the emission wavelength range of the g light. Accordingly, the color gamut represented by the triangle with points R', G' and B' as vertices is narrowed with respect to the target color gamut. That is, even if a laser light source which emits light having a high color purity is used as a light source of a display device, the color gamut thereof is sometimes not enlarged as in the case where a laser light source which emits light having low color purity is used. From FIG. 1, it can be seen that the reduction of the color gamut of the display device is greatly influenced by the transmittance of b light through the green filter film.

A display device according to a first embodiment will be explained with reference to FIGS. 3 to 6. FIG. 3 is a perspective view illustrating a display device DSP according to the first embodiment.

The display device DSP comprises a display panel PNL, a driving IC chip IC which drives the display panel PNL, an illumination unit 100 which illuminates the display panel PNL, a control module CM which controls the operations of the display panel PNL and the illumination unit 100, flexible printed circuits FPC1 and FPC2 which transmit control signals to the display panel PNL and the illumination unit 100, etc. It should be noted that in each of the embodiments, a first direction X is, for example, a direction along each of short-sides of the display panel PNL. A second direction Y is perpendicular to the first direction X, and is also a direction along each of long sides of the display panel PNL. A third direction Z is perpendicular to the first direction X and the second direction Y. Also, in each embodiment, a display surface of a first substrate SUB1 is a surface where a display area DA is located, and a rear surface of the first substrate SUB1 is located opposite to the display surface. Furthermore, it should be noted that in the following, the terms "above" and "below" are used such that "above" is in a direction from the rear surface toward the display surface, and "below" is in a direction from the display surface toward the rear surface.

The display panel PNL comprises the first substrate SUB1, a second substrate SUB2 located opposite to the first substrate SUB1 and a liquid crystal layer LQ described later. The display panel PNL comprises the display area DA, in which an image is displayed, and a non-display area NDA formed in the shape of a frame, which is located around the display area DA, and which is defined by a peripheral frame-shaped light-shielding layer LSL formed in the second substrate SUB2. The display panel PNL comprises pixels PX which are provided in the display area DA and arranged in a matrix, for example, in the first direction X and the second direction Y.

The illumination unit 100 is located below the first substrate SUB1 of the display panel PNL, facing the first substrate SUB1. The illumination unit 100 corresponds to a backlight unit which illuminates the display panel PNL from the rear surface side thereof.

The driving IC chip IC is mounted on the first substrate SUB1 of the display panel PNL. A flexible printed circuit FPC1 is mounted on the first substrate SUB1, and connects the display panel PNL and the control module CM. A flexible printed circuit FPC2 connects the illumination unit 100 and the control module CM.

The display device DSP having the above structure is a transmissive liquid crystal display device which has a transmission display function of displaying an image by selectively causing the pixels PX to transmit light emitted from the illumination unit 100 on the display panel PNL, thereby displaying an image.

FIG. 4 is a view illustrating the configuration of a pixel PX.

Each of pixels PX comprises a switching element PSW, a pixel electrode PE, a common electrode CE, a liquid crystal layer LQ, etc. The switching element PSW is formed of, for example, a thin-film transistor (TFT). The switching element PSW is electrically connected to a scanning line G, a signal line S and the pixel electrode PE. For example, the scanning line G extends in the first direction X, and the signal line S extends in the second direction Y. It should be noted that the scanning line G and the signal line S may be linearly formed, or at least part of each of these lines may be bent. The liquid crystal layer LQ is driven by an electric field generated between the pixel electrode PE and the common electrode CE. A storage capacitance CS is a capacitance formed between, for example, the common electrode CE and the pixel electrode PE.

Figure 5A:
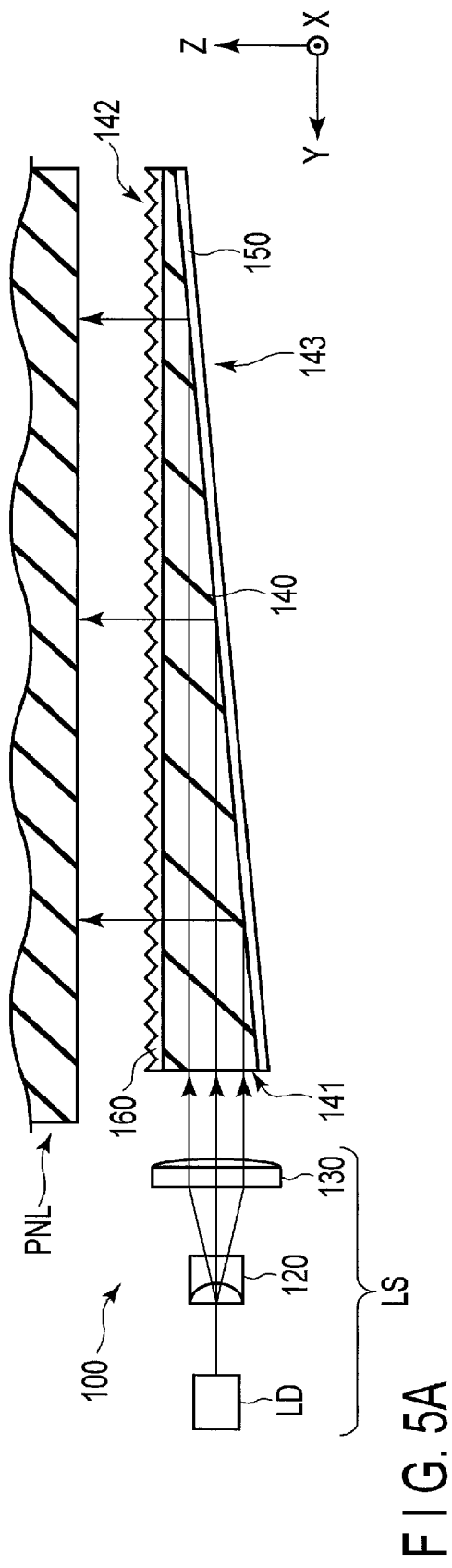
FIG. 5A is a schematic cross-sectional view illustrating an illumination unit provided in the display device of the first embodiment.
Figure 5B:
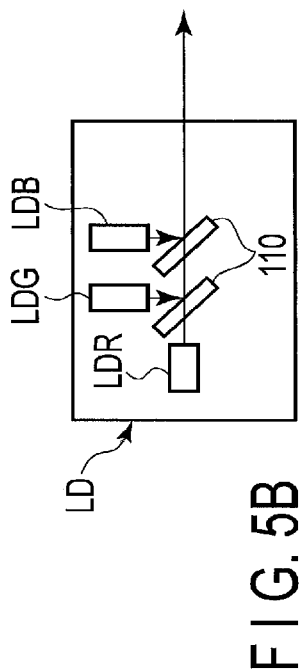
FIG. 5B is a schematic view illustrating a laser light source provides in the illumination unit of FIG. 5A.

FIG. 5A is a schematic cross-sectional view illustrating the illumination unit 100 of the display device DSP according to the first embodiment, and its scale is different from the scale of FIG. 3. The illumination unit 100 comprises a light source unit LS and a light-guide unit 140. The light source unit LS comprises a laser light source unit LD and optical lenses 120 and 130. As illustrated in FIG. 5B, the laser light source unit LD includes a red laser light source (hereinafter referred to as the R light source) LDR which emits a red laser beam (hereinafter referred to as R light), a green laser light source (hereinafter referred to as the G light source) LDG which emits a green laser beam (hereinafter referred to as G light), and a blue laser light source (hereinafter referred to as the B light source) LDB which emits a blue laser light beam (hereinafter referred to as B light). The R light source LDR, the G light source LDG and the B light source LDB are configured to respectively emit R light, G light and B light which are, for example, polarized in the same direction. The R light source LDR, the G light source LDG and the B light source LDB are provided with, for example, respective collimating lenses, and emit parallel light. The R light, the G light and the B light are combined into white laser light by, for example, a dichroic mirror 110.

The R light source LDR is, for example, a red laser diode. The red laser diode is formed of, for example, an aluminum gallium indium phosphide (AlGaInP)-based semiconductor material or a GaInP-based semiconductor material. The center emission wavelength of the R light is 600 to 650 nm, preferably 620 to 640 nm. Also, it is preferable that the R light be a narrow band light having an emission intensity the half bandwidth of which is 5 nm or less.

The G light source LDG is, for example, a green laser diode. The green laser diode is formed of, for example, an indium gallium nitride (InGaN)-based semiconductor material or a zinc selenide (ZnSe)-based semiconductor material. The center emission wavelength of the G light is 525 to 550 nm, preferably 530 to 540 nm. Also, it is preferable that the G light be a narrow band light having an emission intensity the half bandwidth of which is 5 nm or less. Furthermore, the difference between the center emission wavelength of the G light and that of the B light falls within the range of 65 to 95 nm, preferably the range of 65 to 85 nm.

The B light source LDB is, for example, a blue laser diode. The blue laser diode is formed of, for example, a gallium nitride (GaN)-based semiconductor material or an InGaN-based semiconductor material. It should be noted that the proportion of indium in the crystal of the InGaN-based semiconductor material of which the blue laser diode is formed is less than that of the InGaN-based semiconductor material of which the green laser diode is formed. The center emission wavelength of the B light is 450 to 480 nm, preferably 460 to 475 nm, and more preferably 460 to 470 nm. Also, it is preferable that the B light be a narrow-band light having an emission intensity the half bandwidth of which is 5 nm or less.

It should be noted that the wavelength of the green light is between that of the red light and that of the blue light. Thus, the wavelength at which the maximum light transmittance is exhibited at the green filter film is difficult to be greatly shifted toward a long-wavelength side. On the other hand, even if the blue filter film is formed such that the wavelength at which the maximum light transmittance is exhibited is made shorter, it does not have an influence on leakage of light having other colors. Therefore, it is preferable that the center emission wavelength of the B light be less than 467 nm which is the target wavelength, and that of the G light be less than 532 nm which is the target wavelength. If G light has a short wavelength as B light, it is possible to reduce a disagreement in reproducibility of the target gamut in the x, y chromaticity diagram.

A laser beam having a short wavelength may be produced by halving the wavelength of light by use of a second harmonic generator (SHG). It is thereby possible to produce a laser beam having a short wavelength, using an infrared laser diode which has a long life and a high output. In particular, in the case where an LD excitation fiber laser and an SHG are used in combination, it is possible to achieve a G light source having a high output, which is preferable. It should be noted that a semiconductor laser diode such as a side-emitting type semiconductor laser diode having a ridge structure is suitable as a light source since the polarization state of its emitted light can be easily adjusted. In the case where the R light source LDR, the G light source LDG and the B light source LDB are semiconductor laser diodes, they can increase emitting intensity by increasing current supplied.

It should be noted that while the backlight is emitting light, preferably, the emission intensity of G light should be lower than those of R light and B light for the following reasons. First, in the case of using a light source which emits light having an emission dominant wavelength in the first embodiment, if the emission intensity of the G light is reduced, a satisfactory white light can be obtained. Second, green light has a high luminosity factor, and even if green light having low emission intensity is emitted, it can be felt strongly. In addition, a laser diode is difficult to strong then the emission intensity of green light. Furthermore, it is more preferable that the emission intensity of the B light be lower than that of the R light. It should be noted that in a laser light source unit which can emit light having a luminous intensity nearly equal to that of light emitted from a YAG-LED, the ratio between the emission intensities of R light, G light and B light (emission intensity of R light: emission intensity of G light: emission intensity of B light) is 1:0.7:0.95. To measure the radiant flux of a laser beam, a spectral radiometer can be used, for example, CS-2000(A) which is a spectral radiance meter made by Konica Minolta Inc. or SR-3AR which is a spectral radiometer made by Topcon Technohouse Corp.

The optical lens 120 increases the width of a laser beam emitted from the laser light source unit LD. The optical lens 130 transforms as appropriate the laser light into parallel light to be evenly incident on a side surface 141 of the light-guide unit 140. The optical lens 130 is not limited to a specific one; that is, any optical lens can be used as the optical lens 130 as long as it can converge light to emit parallel light. For example, a diffraction lens or a Fresnel lens can be used.

The light-guide unit 140 is located below the display panel PNL, facing the first substrate SUB1. The light-guide unit 140 is formed, for example, in a wedge shape. The side surface 141 of the light-guide unit 140 is located to face the light source unit LS. Furthermore, the light-guide unit 140 includes a first main surface which faces the display panel PNL and a second main surface 143 located opposite to the first main surface 142. The side surface 141 is a flat surface parallel to the X-Z plane. The first main surface 142 is a flat surface extending parallel to the X-Y plane. The second main surface 143 is an inclined surface extending in a direction inclined from the second direction Y toward the third direction Z. The second main surface 143 is gently inclined such that a laser beam entering the side surface 141 is totally reflected on the second main surface 143. The second main surface 143 is inclined such that a laser beam reflected therefrom is incident perpendicularly on the first main surface 142. The light-guide unit 140 extends over an entire area of the display panel PNL, which area corresponds to the display area DA.

The light-guide unit 140 is formed of, for example, a light-transmissive resin. Also, it is preferable that the light-guide unit 140 have a low birefringence in order to maintain the polarization direction of a laser beam passing through the light-guide unit 140. Also, if the light-guide unit 140 has a low birefringence, it is preferable that for example, the light retardation in the light-guide unit 140 be less than or equal to a quarter of the dominant wavelength of light incident on the light-guide unit 140. In such a case, the light-guide unit 140 is formed of, for example, a copolymer or a mixture which is composed of a positive birefringent material and a negative birefringent material. For example, it is formed of a polymer having intrinsic birefringent of $3\times10^{-3}$ or less in terms of an absolute value.

In the mixture, a polymer having a positive birefringence and a polymer having a negative birefringence are mixed at an appropriate ratio such that when molecules of these polymers are aligned, the birefringence of the polymers cancel each other, thereby microscopically preventing birefringence from exhibiting. Alternatively, rod-like low molecules having polarizability anisotropy are added to a polymer, thereby canceling the birefringence of the polymer. In the copolymer, monomers having a positive intrinsic birefringent and monomers having a negative intrinsic birefringent are copolymerized at an appropriate ratio to cancel polarizability anisotropy in a polymer chain. As the above mixture or copolymer, for example, a mixture or copolymer described in JP 5263771 B, paragraphs [0043] to [0052], can be used.

It should be noted that referring to FIG. 5, a reflection sheet 150 may be provided on the second main surface 143 of the light-guide unit 140. The reflection sheet 150 reflects light passing through the second main surface 143 of the light-guide unit 140 into the light-guide unit 140. Also, a prism sheet 160 may be provided on the first main surface 142 of the light-guide unit 140. The prism sheet 160 refracts and converges light guided by the light-guide unit 140 to uniformly illuminate the display panel PNL and thus raise the luminance thereof. In the prism sheet 160, a surface facing the display panel is made up of a plurality of prisms. In the prism sheet 160, preferably, the longitudinal direction of the prisms should be parallel to the polarization direction of an incident laser beam. Also, preferably, the prism sheet 160 should have a low birefringence in order to maintain the polarization direction of a laser beam passing through the prism sheet 160. The prism sheet 160 having a low birefringence can be formed of the same material as, for example, the light-guide unit 140.

A laser beam emitted from the laser light source unit LD is, for example, polarized light the polarization direction of which is perpendicular to the plane of the drawing sheet. Also, the laser beam emitted from the laser light source unit LD is given output angle by, for example, the optical lens 120. Then, the laser beam given output angle is incident on, for example, the Fresnel lens 130, and transformed into parallel light having a width corresponding to the width of the side surface 141 of the light-guide unit 140. The parallel light is perpendicularly incident on the side surface 41 of the light-guide unit 140, while, for example, the polarization direction being kept perpendicular to the drawing sheet. The light passing through the side surface 141 is incident as parallel light upon the second main surface 143, while maintaining its polarization direction. Then, the light incident on the second main surface is reflected by the second main surface 143, and output as parallel light from the first main surface 142, while maintaining the polarization direction. A laser beam emitted from the light source unit LS is guided by the light-guide unit 140, and then output from substantially the entire surface of the first main surface 142. In such a manner, the light-guide unit 140 guides, for example, a polarized laser beam which is emitted from the light source unit LS toward color filter units, while maintaining the polarization direction of the laser beam.

FIG. 6 is a schematic cross-sectional view of the display panel PNL.

The display panel PNL is provided to face the first main surface 142 of the light-guide unit 140. The display panel PNL comprises first pixels PX1, second pixels PX2 and third pixels PX3.

FIG. 6 illustrates by way of example a liquid crystal display device having a display mode which utilizes a lateral electric field. However, the display mode of the liquid crystal display device according to the first embodiment is not limited to a specific one; that is, it may be, for example, a display mode utilizing another electric field such as a longitudinal electric field.

The first substrate SUB1 is formed of a first insulating substrate 10 which is transparent, such as a glass substrate or a resin substrate. The first substrate SUB1 is provided with the common electrode CE, pixel electrodes PE, a first insulating film 11, a second insulating film 12 and a first alignment film AL1, etc., on a side of the first substrate SUB1 which faces the second substrate SUB2 of the first insulating substrate 10. The common electrode CE is formed on the first insulating film 11, and extends over pixels PX1 to PX3. The second insulating film 12 covers the common electrode CE. It should be noted that between the first insulating substrate 10 and the first insulating film 11, gate lines, source lines, switching elements (not shown), etc., are formed. The pixel electrodes PE are formed on the second insulating film 12 and opposite to the common electrode CE. The pixel electrodes PE include slits SLA which are formed opposite to the common electrode CE. The pixel electrodes PE are covered with the first alignment film AL1. The common electrode CE and the pixel electrodes are formed of a transparent electrically conductive material such as indium tin oxide or indium zinc oxide.

The second substrate SUB2 is formed of a second insulating substrate 20 which is transparent, such as a glass substrate or a resin substrate. The second substrate SUB2 includes a light-shielding layer BM, color filter units CF, an overcoat layer OC, a second alignment film AL2, etc., on a side of the second insulating substrate 20, which is opposite to the first substrate SUB1. The light-shielding layer BM is formed on an inner surface of the second insulating substrate 20 which faces the first substrate SUB1. The light-shielding layer BM is formed of a black resin material or a light-shielding metallic material. The color filter units CF are formed on the inner surface of the second insulating substrate 20, and each portion of the color filter units CF overlap with the light-shielding layer BM. The color filter units CF are located opposite to pixel electrodes PE1, PE2 and PE3, with the liquid crystal layer LQ interposed between the color filters CF and the pixel electrodes PE1, PE2 and PE3.

The color filter units CF include a red filter film CFR, a green filter film CFG and a blue filter film CFB.

The red filter film CFR contains a red color material. As the red color material, red dyes or red pigments can be applied. Preferably, the red color material should contain at least one of dyes or pigments which are selected from anthraquinone-based dyes, diketopyrrolopyrrole-based dyes, anthraquinone-based pigments and diketopyrrolopyrrole-based pigments. As the red dyes, for example, red dyes described in JP 2014-6326 A can be used. The red pigments are, preferably, pigment red 177, pigment red 179, pigment red 254 or pigment red 255, and more preferably, pigment red 177 or pigment red 254.

Preferably, the green filter film CFG should contain a green color material and a yellow color material. The ratio by weight between green pigments and yellow pigments (the weight of the green pigments: the weight of the yellow pigments) in the green filter film CFG falls within, preferably the range of 98:2 to 30:70 and more preferably the range of 95:5 to 40:60. In the case where the green filter film CFG contains a green color material and a yellow color material, a curve representing the spectral transmission characteristic of the green filter film CFG is shifted toward a long-wavelength side as compared with a green filter film containing a green color material only. If the green color filter CFG contains yellow pigments in an amount of more than 70% by weight, the transmittance of R light which is light having a long wavelength becomes high, thus reducing the color purity of light transmitted through the green filter film CFG. This is not desirable. In addition, if the green color filter CFG contains yellow pigments in an amount of less than 2% by weight, the transmittance of B light becomes high, thus reducing the color purity of light transmitted through the green filter film CFG. Also, this is not desirable.

Furthermore, in the green filter film CFG, the difference between the wavelength at which the maximum light transmittance is exhibited and the wavelength at which light transmittance of 10% is exhibited on the shorter wavelength side is 70 nm or less. Preferably, the difference should be 60 nm or less. In the green filter film CFG, it is preferable that the wavelength at which of light transmittance of 10% is exhibited on the shorter wavelength side be longer than the center emission wavelength of B light. Also, in the green filter film CFG, preferably, the light transmittance of light having the center emission wavelength of B light be 5% or less. Since the green filter film CFG has the above features, it has a narrow-band spectral transmission characteristic, and the transmittance of B light is decreased, thus increasing the color purity of light transmitted through the green filter film CFG. In the green filter film CFG, the wavelength at which the maximum light transmittance is exhibited is, preferably, 520 to 540 nm, and more preferably, 525 to 538 nm. It should be noted that in each of sub-pixels, it is preferable that the area of the green filter film CFG be greater than that of each of the red filter film CFR and the blue filter film CFB.

As the green color material, green dyes or green pigments can be applied. Preferably, the green color material should contain phthalocyanine-based dyes and/or phthalocyanine-based pigments. As the green dyes, for example, green dyes described in JP 2014-6326 A can be applied. Also, for example, as the green pigments, pigment green 7, pigment green 36 or pigment green 58 can be applied.

As the yellow color material, yellow dyes or yellow pigments can be applied. Preferably, the yellow color material should contain azo-based dyes and/or azo-based pigments. As the yellow dyes, for example, yellow dyes described in JP 2014-6326 A can be applied. Also, for example, the yellow pigments are, preferably, pigment yellow 139, pigment yellow 150, pigment yellow 155 or pigment yellow 185.

It is preferable that the green filter film contains at least one green pigment selected from pigment green 7 and pigment green 36 and at least one yellow pigment selected from pigment yellow 139, pigment yellow 150 and pigment yellow 185. In such a green filter film, the tinting power of the pigments is stronger than that of a green filter film containing another kind of green pigments and another kind of yellow pigments only. Therefore, even if the green filter film is formed thinly, it can reduce the transmittance of light having a center emission wavelength of B light.

It should be noted that in a combination of pigment green 7 and pigment yellow 139, the ratio by weight between green pigments and yellow pigments falls within, preferably the range of 90:10 to 55:45 and more preferably the range of 65:35 to 55:45. In a combination of pigment green 7 and pigment yellow 185 and a combination of pigment green 7, pigment yellow 139 and pigment yellow 185, the ratio by weight between green pigments and yellow pigments falls within, preferably 90:10 to 30:70 and more preferably the range of 80:20 to 50:50. In a combination of pigment green 7 and pigment yellow 150, the ratio by weight between green pigments and yellow pigments falls within, preferably the range of 65:35 to 40:60 and more preferably the range of 60:40 to 45:55. In a combination of pigment green 36 and pigment yellow 185, the ratio by weight between green pigments and yellow pigments falls within, preferably the range of 95:5 to 85:15.

Preferably, the blue filter film CFB should contain a first color material and a second color material. It is preferable that the wavelength of the light having the maximum light transmittance in the second color material be shorter than that in the first color material. The first color material is, for example, a blue color material, and the second color material is, for example, a purple color material. A preferred example of the blue color material is, for example, a color material in which a wavelength at which a maximum light transmittance is exhibited is 435 to 480 nm. A preferred example of the purple color material is, for example, a color material in which a wavelength at which a maximum light transmittance is exhibited is 400 to 435 nm. Preferably, the blue filter film CFB should contain a blue color material and a purple color material. The blue filter film CFB contains, for example, pigment blue 15:6 as a blue color material and also pigment violet 23 as a purple color material, with these blue and purple color materials mixed together. The ratio by weight between the blue and purple color materials (the weight of the blue color material: the weight of the purple color material) falls within, preferably the range of 85:15 to 20:80 and more preferably the range of 80:20 to 25:75. In such a case, the blue filter film CFB can be formed to have a proper thickness and a proper brightness.

In the blue filter film CFB, the difference between the wavelength at which a maximum light transmittance is exhibited and the wavelength at which light transmittance of 10% is exhibited on longer wavelength side falls within, preferably the range of 70 nm or less and more preferably the range of 60 nm or less. Furthermore, in the blue filter film CFB, it is preferable that the wavelength at which the maximum light transmittance is exhibited be shorter than the center emission wavelength of B light. If the blue filter film CFB is formed in the above manner, it has a narrow-band spectral transmission characteristic, the transmittance of G light is reduced, and the color purity of light passing through the blue filter film CFB is enhanced.

As the blue color material, blue dyes or blue pigments can be used. Preferably, the blue color material should contain phthalocyanine-based dyes and/or phthalocyanine-based pigments. As the blue dyes, for example, blue dyes described in JP 2014-6326 A can be applied. As the blue pigments, for example, pigment blue 15, pigment blue 15:1, pigment blue 15:2, pigment blue 15:3, pigment blue 15:4, pigment blue 15:6, pigment blue 16, pigment blue 22, pigment blue 60, pigment blue 64 or the like can be used; and preferably, pigment blue 15:3, pigment blue 15:4, pigment blue 15:6 or pigment blue 60 should be used. As the purple color material, for example, pigment violet 23 can be used. If the blue filter film CFB contains a blue color material and a purple color material, a spectral transmission characteristic in a blue filter film CFB is sift on shorter wavelengths side than containing a blue color material only. As a result, the transmittance of G light in the blue filter film CFB is reduced, and the color purity of light transmitted through the blue filter film CFB is enhanced.

It should be noted that the thickness of each of the red filter film, the green filter film and the blue filter film in the color filter unit is preferably 20 μm or less, and more preferably 0.5 to 6 μm. In order to improve the color purity of light transmitted through the red filter film, the green filter film and the blue filter film, it is effective to increase the thickness of each of these filter films to increase the amount of the color material, in addition to adjustment of the composition of color materials. Furthermore, it is preferable that the blue filter film or the green filter film be thicker than the red filter film, and also that the color material concentration of the blue filter film or the green filter film be higher than that of the red filter film. Thereby, it is possible to suppress transmission of a green laser beam through the blue filter film and that of a blue laser beam through the green filter film.

The overcoat layer OC covers the color filter units CF. The overcoat layer OC is formed of a transparent resin material. The overcoat layer OC is covered with the second alignment film AL2. The first alignment film AL1 and the second alignment film AL2 are each formed of material having a horizontal alignment property.

The first substrate SUB1 and the second substrate SUB2 are bonded to each other, with a predefined cell gap defined between them. The liquid crystal layer LQ is selected in the cell gap between the first alignment film AL1 and the second alignment film AL2.

A first optical film OD1 including a first polarizer PL1 is disposed below the first substrate SUB1. A second optical film OD2 including a second polarizer PL2 is disposed above the second substrate SUB2.

On the upper side of the second polarizer PL2, for example, a light scattering layer DL is formed. The light scattering layer contains light scattering particles. In the first embodiment, since the laser beam is parallel light, there is a possibility that the brightness will not be uniform in the display area, unless the laser beam is scattered by the light scattering layer. It is therefore preferable that the light scattering layer DL be provided above the second polarizer PL2. The light scattering particles are not particularly limited as long as they can scatter light, and may be organic particles or inorganic particles. Preferably, the light scattering particles are inorganic particles. As the inorganic particles, particles of an inorganic oxide such as silica or alumina are preferred.

Although in the example illustrated in FIG. 6, the color filter units CF are formed on the second substrate SUB2, they may be formed on the first substrate SUB1. For example, the first insulating film 11 may be replaced by the color filter units CF, or the color filter units CF may be provided between the first insulating substrate 10 and the first insulating film 11.

Furthermore, parameters of the red, green and blue filter films may be measured after other light-transmissive elements such that glass substrates, insulating layers, polarizers and pixel electrodes have been provided. The influence of these light-transmissive elements upon the measurement is negligibly small.

It should be noted that although the example illustrated in FIG. 6 is a display panel PNL in which pixel electrodes PE and common electrode CE are provided on the first substrate SUB1, the structure of the display panel PNL is not limited to this; that is, the display panel PNL can be variously structured as appropriate in accordance with the display mode of the display panel PNL.

In the display device DSP according to the first embodiment, a laser beam emitted from the light source unit LS is guided by the light-guide unit 140 toward the color filter units CF. The polarization direction of the laser beam output from the first main surface 142 of the light-guide unit 140 is, for example, perpendicular to the drawing sheet. Since the polarizing axis of the first polarizer PL1 is, for example, perpendicular to the drawing sheet, the emitted laser beam is not absorbed in the first polarizer PL1 and can thus be transmitted therethough. In this case, the laser beam is transmitted, without losing its parallelism, through the liquid crystal layer LQ, and then incident substantially perpendicularly on the color filter units CF. The green filter film CFG, as described above, has the narrow-band spectral transmission characteristic, and is configured such that B light is not easily transmitted through the green filter film CFG, as compared with the conventional color filter unit. Therefore, in the green filter film CFG, the transmittance of B light is reduced, as a result of which the color purity of light transmitted through the green filter film CFG is enhanced. Thus, the color gamut of the display device DSP can be widened closer to the target gamut.

Furthermore, in the case where the laser beam is polarized, and the polarization direction of the laser beam is parallel to the polarizing axis of the first polarizer PL1, it is possible to reduce the loss of the laser beam at the first polarizer PL1. Thereby, the display device DSP can emit a light having high luminance with low power consumption. Furthermore, in the case where the polarization degree of the laser beam output from the light-guide unit 140 is sufficiently high, the display device DSP does not need to include the first polarizer PL1. In that case, the manufacturing cost can be reduced.

Next, display devices according to second to fifth embodiments will be explained. It should be noted that the second to fifth embodiments can obtain the same advantages as the first embodiment.

Figure 7:
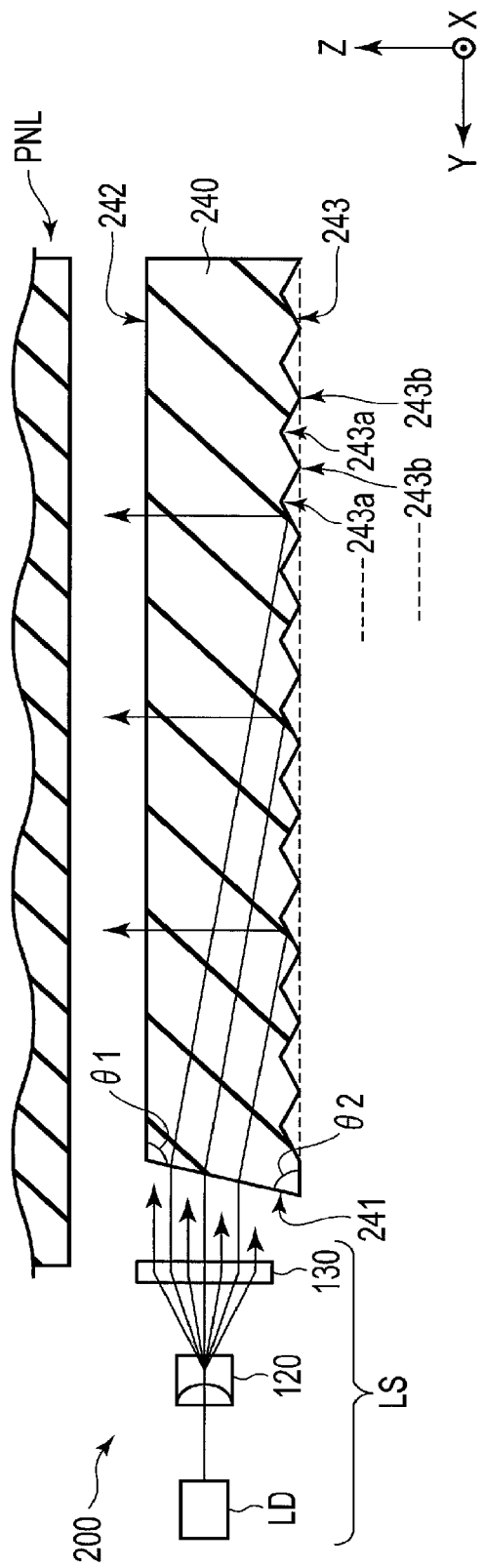
FIG. 7 is a schematic cross-sectional view of an illumination unit provided in a display device according to a second embodiment.

FIG. 7 is a schematic cross-sectional view of an illumination unit 200 provided in the display device according to the second embodiment. The display device according to the second embodiment has the same structure as the display device DSP according to the first embodiment, except for the illumination unit 200. The illumination unit 200 is different from the illumination unit as illustrated in FIG. 5A, regarding the shape of a light-guide unit.

In the second embodiment, a side surface 241 of a light-guide unit 240 is inclined with respect to the X-Y plane. The side surface 241 is inclined at obtuse angle θ1 with respect to a first main surface 242, and also at acute angle θ2 with respect to a second main surface 243. When a laser beam is transmitted into the light-guide unit 240 through the side surface 241, it is refracted toward a second main surface 243. The second main surface 243 has concavo-convex shape as illustrated in the cross-sectional view of FIG. 7. The concavo-convex shape of the second main surface 243 is formed so that an incident laser beam satisfies the total reflection condition. Also, at the second main surface 243, the laser beam is reflected in a direction perpendicular to the first main surface 242, while maintaining its parallelism. The first surface 242 is formed such that light is output perpendicularly therefrom toward the reverse surface of a display panel PNL. The first main surface 242 is a flat surface extending parallel to the X-Y plane. When the laser beam is output from the light-guide unit 240 through the first main surface 242, it is not refracted. Therefore, a laser beam emitted from the light source unit LS is guided by the light-guide unit 240, and incident on the display panel PNL as parallel light which is parallel to the normal to the main surface of the display panel PNL.

Between the light-guide unit 240 of the illumination unit 200 and a first substrate SUB1 of the display panel PNL, no prism sheet is provided. Also, no prism sheet is provided in the display panel PNL or between the display panel PNL and color filter units CF. Therefore, the laser beam guided by the light-guide unit 240 is emitted onto the color filter units CF without passing through a prism sheet.

Figure 8:
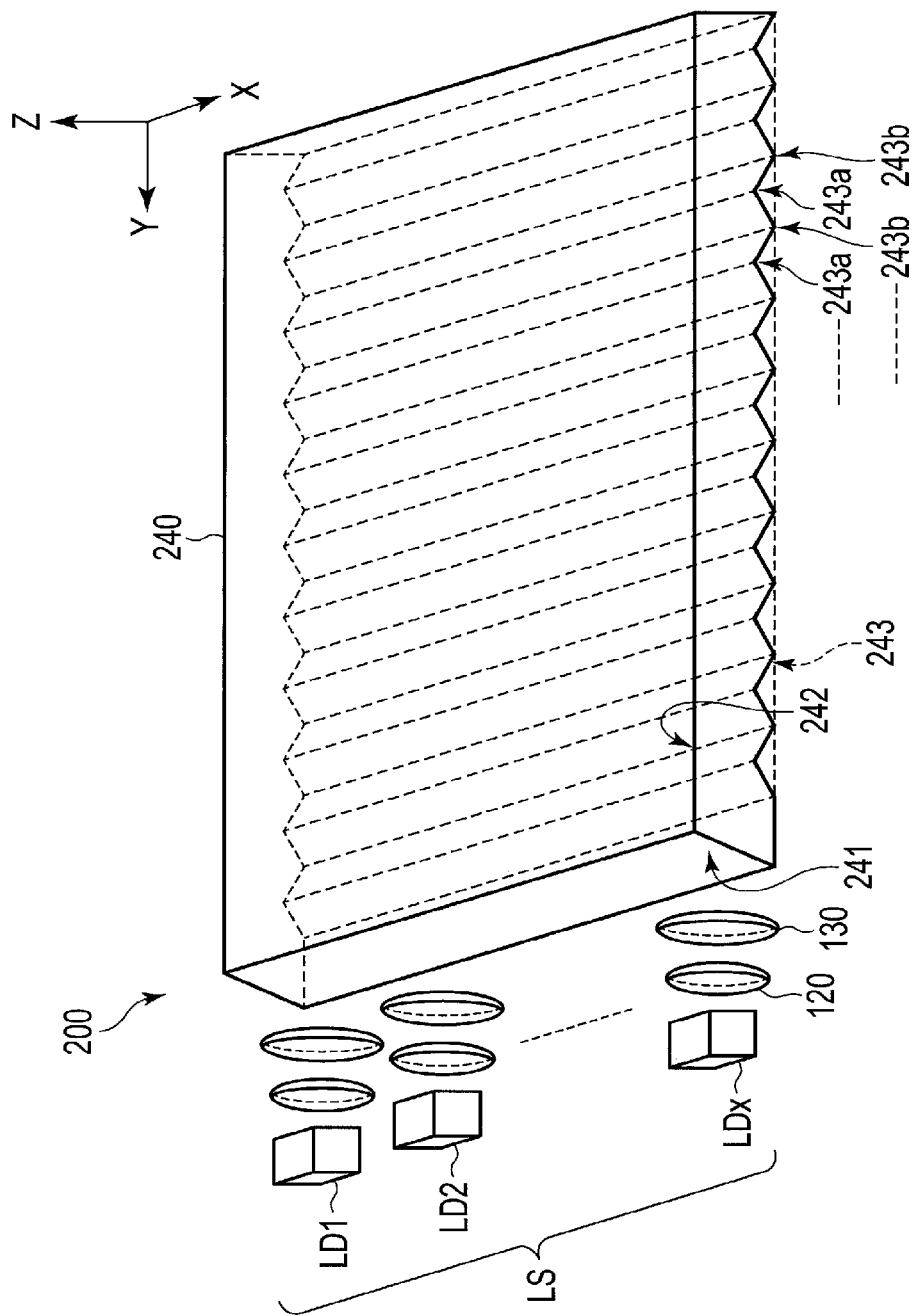
FIG. 8 is a perspective view of the illumination unit as illustrated in FIG. 7.

FIG. 8 is a perspective view of the illumination unit 200 as illustrated in FIG. 7.

At the second main surface 243, concave portions 243a and convex portions 243b extend in the first direction X, and are alternately arranged in the second direction Y. In the example illustrated in FIG. 8, the concave and convex portions of the second main surface 243 are continuously formed from one end to the other end of the second main surface 243e; however, they may be partially discontinuous. In a region close to the side surface 241 of the light-guide unit 240, for example, a plurality of laser light source units (LD1, LD2, . . . , LDx) are arranged. The laser light source units (LD1, LD2, . . . , LDx) each has the same structure as, for example, the laser light source unit LD according to the first embodiment. The laser light source units (LD1, LD2, . . . , LDx) are arranged in the first direction X. The illumination unit 200 comprises a plurality of sets of optical lenses 120 and 130, which are associated with the laser light source units, respectively. Thereby, laser beams emitted from the laser light source units are incident on substantially the entire side surface 241, and output from substantially the entire first main surface 242. It should be noted that referring to FIG. 8, the light source unit LS is provided on only one surface side of the light-guide unit 240, i.e., it is provided close to the side surface 241; however, light source units LS may be respectively provided on both surface sides of the light-guide unit 240.

Figure 9:
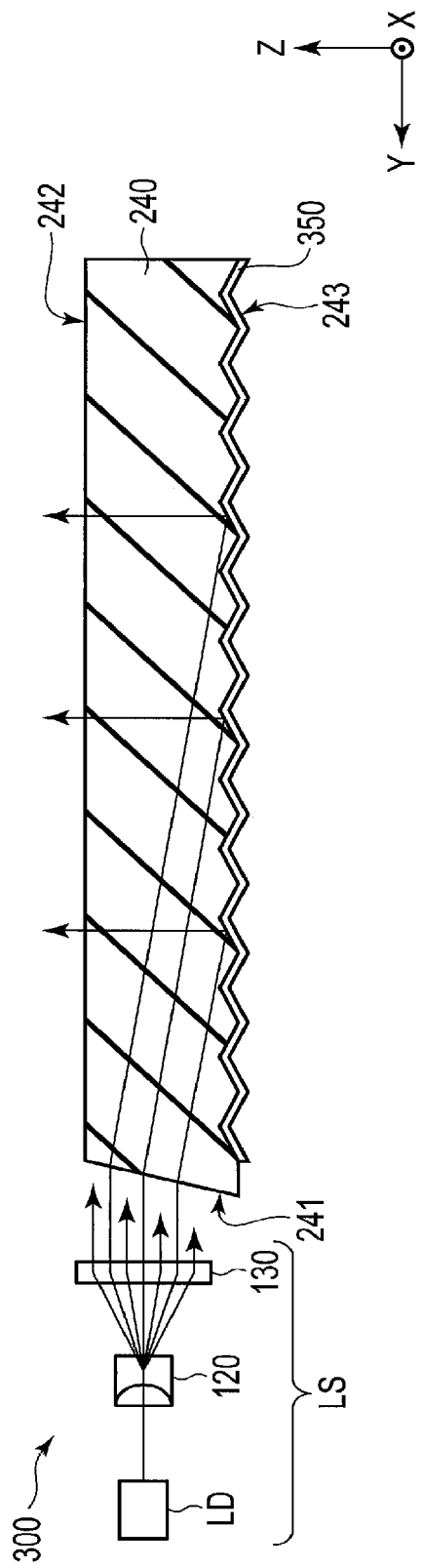
FIG. 9 is a schematic cross-sectional view of an illumination unit provided in a display device according to a third embodiment.

FIG. 9 is a schematic cross-sectional view of an illumination unit 300 provided in a display device according to a third embodiment. The display device according to the third embodiment has the same structure as the display device DSP according to the first embodiment, except for the illumination unit 300.

Figure 10:
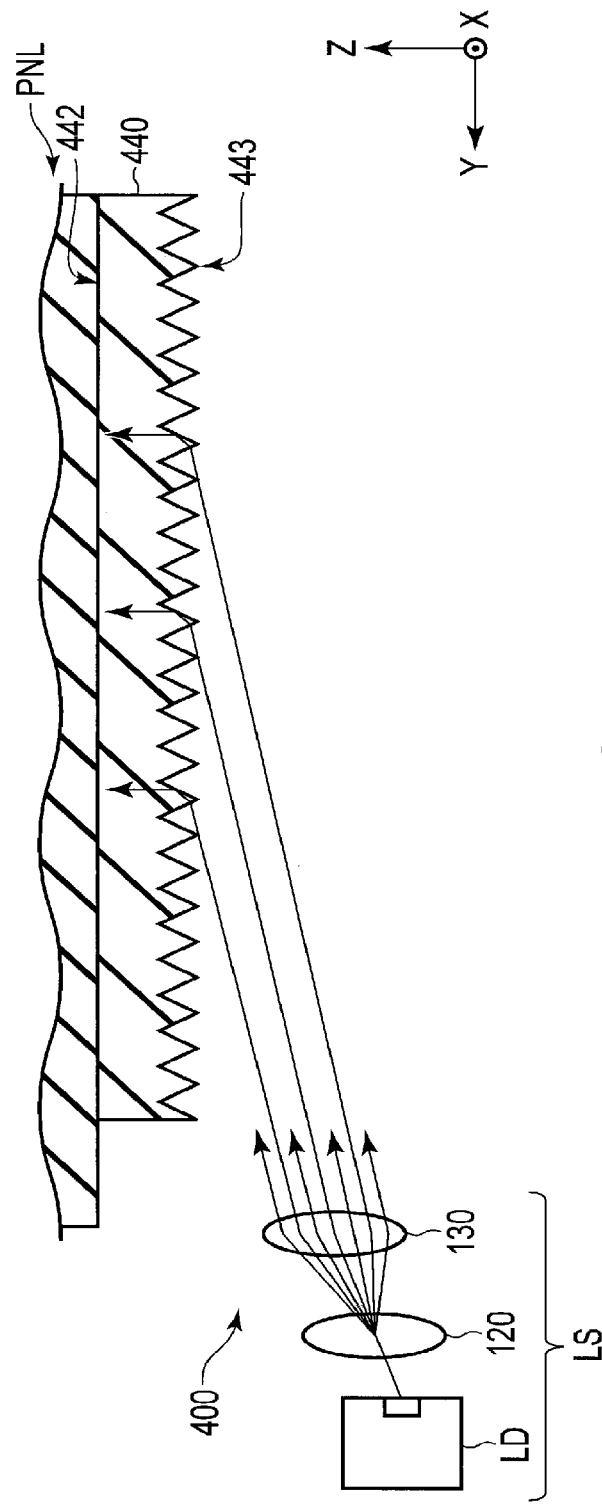
FIG. 10 is a schematic cross-sectional view of an illumination unit provided in a display device according to a fourth embodiment.

To be more specific, in the illumination unit 300, a reflection plate 350 is provided at a second surface 243. In this regard, the illumination unit 300 is different from the illumination unit 200 as illustrated in FIG. 10. The reflection plate 350 is provided along an irregular surface of the second main surface 243. The reflection plate 350 has a high-reflection characteristic in the dominant wavelength of a laser beam incident on the second surface 243. The laser beam incident into a light-guide unit through a side surface 241 is secularly reflected by the reflection plate 350 and guided toward a display panel PNL.

FIG. 10 is a schematic cross-sectional view of an illumination unit 400 provided in a display device according to a fourth embodiment. The display device according to the fourth embodiment has the same structure as the display device DSP according to the first embodiment, except for the illumination unit 400. In the fourth embodiment, a laser beam is incident through a second surface 443. In this regard, the structure as illustrated in FIG. 10 is different from that as illustrated in of FIG. 5A.

A light source unit LS is further separated from a display panel PNL in the third direction Z than a light-guide unit 440. A laser beam is incident into the light-guide unit 440 through the second main surface 443. When the laser beam is incident from the outside of the light-guide unit 440 thereinto, it is refracted at the concavo-convex shape of second main surface 443, and it is totally reflected at the second main surface 443 inside the light-guide unit 440. Thereby, the laser beam is guided toward the color filter units CF and incident as parallel light onto main surfaces of the color filter units CF in a direction perpendicular to the main surfaces thereof.

Figure 11:
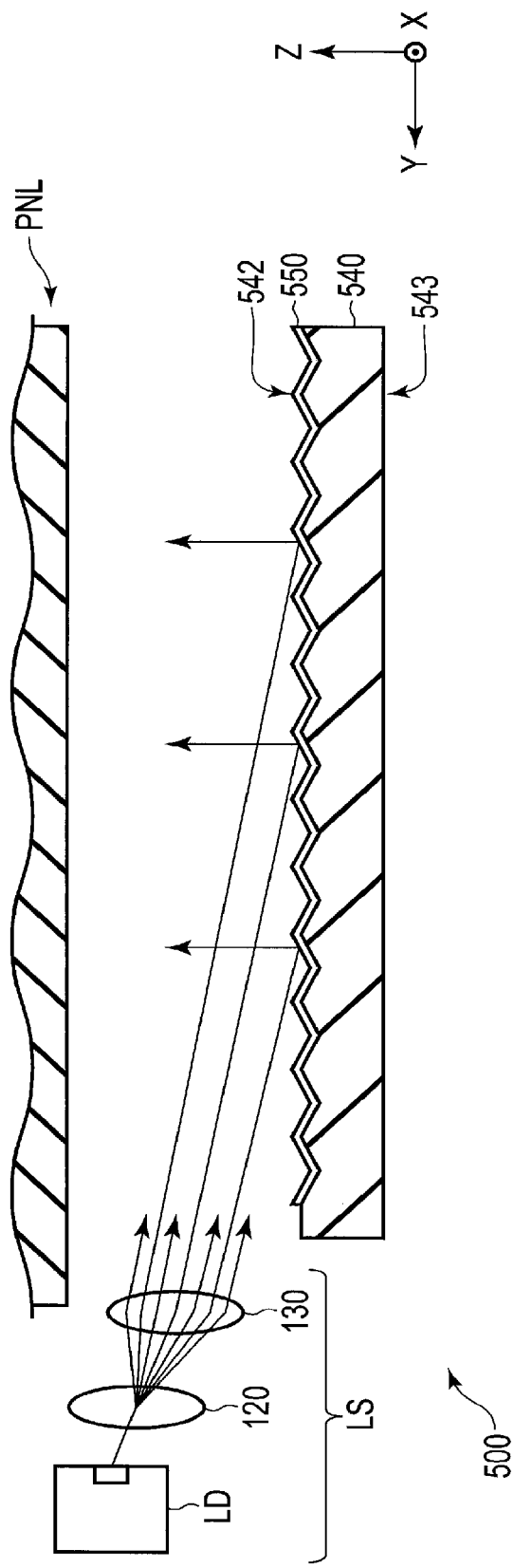
FIG. 11 is a schematic cross-sectional view of an illumination unit provided in a display device according to a fifth embodiment.

FIG. 11 is a schematic cross-sectional view of an illumination unit 500 provided in a display device according to a fifth embodiment. The display device according to the fifth embodiment has the same structure as the display device DSP according to the first embodiment, except for the illumination unit 500. In the fifth embodiment, a laser beam is incident on a first main surface 542. In this regard, the structure as illustrated in FIG. 11 is different from that as illustrated in FIG. 5A.

A light-guide unit 540 is further separated from a display panel PNL in the third direction Z than a light source unit LS. The first main surface 542 is concavo-convex shape consisting of prisms as illustrated in the cross sectional view of FIG. 11. Also, on the first main surface 542, a reflection plate 550 is provided. When a laser beam is incident on the first main surface 542, it is secularly reflected at the first main surface 542 in a direction perpendicular to color filter units CF.

It should be noted that the light source unit LS in the illumination units according to the first to fifth embodiments may include either a single laser light source unit LD or a plurality of laser light sources LD arranged side by side. That is, it may be set that light emitted from a single laser light source unit LD is transformed by an optical lens into parallel light having the width of the light-guide unit. Also, it may be set that a plurality of laser light source units (LD1, LD2, . . . LDx) are arranged in the first direction X and/or the third direction Z on a side-surface side of the light-guide unit, and parallel light is emitted from the laser light source units into the light-guide unit.

FIG. 12 is a graph illustrating a relationship between the thickness (mm) and a spectral transmittance (%) in a light-guide unit formed of resin material as illustrated in FIG. 5A. The spectral transmittances of light transmitted through light-guide units in a direction perpendicular to the thickness direction of the light-guide units were measured with a spectral photometer (CS-2000(A) made by Conica Minolta Inc.). The light-guide units have thickness of 1 mm, 2 mm and 3 m, respectively.

In the light-guide unit having the thickness of 3 mm and formed of resin material, the transmittance of light having a long wavelength of 700 nm is 89%, and that of light having a short wavelength of 400 nm is 80%. This result indicates that the transmittance of light transmitted through the light-guide unit varies in accordance with the wavelength of light. In the light-guide unit having the thickness of 1 mm, the transmittance of light having a light wavelength of 700 nm is 89%, and that of light having a short wavelength of 400 nm is 84.5%. This result indicates that in the case where the thickness of the light-guide unit is increased, the transmittance of light having a long wavelength does not greatly vary, whereas the transmittance of light having a short wavelength greatly varies.

FIG. 13 is a graph in which the result of measurement as illustrated in FIG. 12 is plotted. The horizontal axis represents the thickness (mm) of the light-guide unit and the vertical axis represents the transmittance (%) of light having a wavelength of 532 nm. The light having a wavelength of 532 nm is green light. From FIG. 13, it can be seen that the transmittance of the light having a wavelength of 532 nm is proportional to the thickness of the light-guide unit, i.e., it is decreased as the thickness of the light-guide unit is increased. Also, from this result, it can be seen that the longer the optical path length of light propagating in the light-guide unit, the smaller the transmittance of the light. In addition, it can be seen that the transmittance of the light propagating in the light-guide unit is more greatly reduced as the light has a shorter wavelength.

In the illumination units 100 and 200 using a polarized laser beam as illustrated in FIGS. 5A, 5B and 7, light emitted from the light source unit LS into the light-guide unit propagates from the side surface to the first main surface of the light-guide unit as it takes the shortest course, and it is output from the first main surface. Thus, in the illumination unit using polarized light, the influence of the optical path length of the light propagating in the light-guide unit upon the output light is remarkable.

That is, from the results illustrated in FIGS. 12 and 13, it can be found the following. If the laser beam travels in the light-guide unit by a longer distance, the transmittance of the laser beam is reduced. And, in the light-guide unit formed of resin, light having different wavelengths is different light transmittances. Thus, when laser beams are transmitted under the same distance in light-guide units, the transmittance of laser beam having different colors (wavelengths) are different from each other.

FIG. 14 is a schematic cross-sectional view of a illumination unit 600 according to a modification of the first embodiment. The display device according to the modification of the first embodiment has the same structure as the display device DSP according to the first embodiment, except for an illumination unit 600. In the illumination unit 600, the light source unit LS includes a plurality of laser light source units (first laser light source unit LD1, second laser light source unit LD2 and third laser light source unit LD3). Each of the laser light source units (LD1, LD2 and LD3) has the same structure as the laser light source unit LD according to the first embodiment. The laser light source units (LD1, LD2 and LD3) are opposite to the side surface 141 of the light-guide unit and arranged in the vertical direction (the third direction Z). The illumination unit 600 comprises a plurality of sets of optical lenses (120 and 130), which are associated with the laser light source units, respectively. Thereby, laser beams emitted from the laser light source units are incident on substantially the entire side surface 241.

The optical path length of a laser beam from the first laser light source unit LD1 that propagates from the side surface 141 to the first main surface 142 of the light-guide unit 140 is longer than that of a laser beam from the second laser light source unit LD2. Also, the optical path length of the laser beam from the second laser light source unit LD2 that propagates in the light-guide unit 140 is longer than that of the third laser light source unit LD3. Thereby, in the illumination unit 600 as illustrated in FIG. 14, there is a possibility that the differences between the above different optical path lengths of the laser beams propagating from the side surface 141 to the first main surface 142 of the light-guide unit 140 will cause distribution of the brightness or chromaticity of light emitted from the first main surface 142. That is, in an area of the first main surface 142 in which the optical path length of light propagating in the light-guide unit 140 is long, there is a possibility that the brightness may be reduced. Furthermore, in the above area of the first main surface 142, the transmittance of light having a specific wavelength of R light, G light and B light of emitted light may be greatly reduced. For example, in the case where the transmittance of B light having a short wavelength is greatly reduced, yellow-tinged white light may be emitted from the first main surface 142.

In order to reduce the distribution of the brightness or chromaticity of light from the first main surface of the light-guide unit, it is preferable that: there be provided at least two laser light source units (the first laser light source unit LD1 and second laser light source unit LD2) which emit light to propagate in the light-guide unit such that the optical path lengths of the light are different from each other; and in the case where the optical path length of light from the first laser light source unit LD1 is longer than that of the second laser light source unit LD2, it is preferable that the emission intensity of the light from the first laser light source unit be higher than that of the light from the second laser light source unit. Furthermore, it is preferable that when emitting intensity of polarized laser beam which is incident on the light-guide unit 140 are distributed, in accordance with the optical path lengths of the polarized laser beams propagating from the side surface 141 to the first main surface 142 in the light-guide unit 140. In addition, the first laser light source unit LD1 and the second laser light source unit LD2 each include an R light source, a G light source and a B light source.

In the illumination unit 600 as illustrated in FIG. 14, it is preferable that, in accordance with the optical path lengths of the light propagating in the light-guide unit 140, the emission intensity of light from the first laser light source unit LD1 be higher than that of the second laser light source unit LD2, and that of the second laser light source unit LD2 be higher than that of the third laser light source unit LD3. By this structural feature, it is possible to reduce the distribution of the brightness of light at the first main surface 142, which is caused by the differences between the optical path lengths. Furthermore, in the illumination unit 600 as illustrated in FIG. 14, only a specific one of the R light source LDR, the G light source LDG and the B light source LDB included in the first laser light source unit LD1 may be designed such that the emission intensity of light emitted from the specific light source is high. For example, the emission intensity of B light may be made higher than that of R light and that of G light. Furthermore, in the case where the emission intensity of light from the second laser light source unit LD2 is made higher than that of the first laser light source unit LD1, rate of increase of emission intensity of the light from the specific light source may be made high. For example, in the case where the emission intensity of R light emitted from the second laser light source unit LD2 is raised by 5% as compared to the emission intensity of R light emitted from the first laser light source unit LD1, the emission intensity of B light emitted from the second laser light source unit LD2 may be raised by 10% as compared to the emission intensity of B light emitted from the first laser light source unit LD1.

In the case where the R light source LDR, the G light source LDG and the B light source LDB are semiconductor laser diodes, it is possible to raise the emission intensities of laser beams from these light sources by increasing all current to be supplied thereto. Furthermore, in order to raise the emission intensity of only a laser beam emitted from the B light source LDB, it is effective to increase current to be supplied to the B light source LDB.

In the above structure, the distribution of the chromaticity or brightness of light output from the first main surface 142 of the light-guide unit 140 is reduced. It is therefore possible to provide a display device which can display an image with a high quality. In the illumination unit 600 as illustrated in FIG. 14, it is explained the example that three laser light source units are provided, however, the illumination unit 600 is not limited to this. That is, it is possible to appropriately provide a necessary number of laser light source units in the illumination unit.

FIG. 15 is a schematic cross-sectional view of an illumination unit 700 provided in a display device according to a modification of the second embodiment. The display device according to the modification of the second embodiment has the same structure as the display device DSP according to the first embodiment, except for the illumination unit 700. The light-guide unit 240 has the same structure as the light-guide unit 240 as illustrated in FIG. 7. In the modification, a light source unit LS has the same structure as the light source unit LS as illustrated in FIG. 14. In this case, the optical path length of a laser beam from a first laser light source unit LD1 that propagates in a light-guide unit is longer than that of a laser beam from a second laser light source unit LD2 that propagates in the light-guide unit. Also, the optical path length of the laser beam from the second laser light source unit LD2 that propagates in the light-guide unit is longer than that of a third laser light source unit LD3. In this structure also, as in the modification of the first embodiment, emitting intensities of polarized laser lights which are incident on the light-guide unit 140 are distributed, in accordance with the optical path length of the polarized laser beams propagating from the side surface 141 to the first main surface 142 in the light-guide unit 140. As a result, it is possible to reduce the distribution of the brightness or chromaticity of light at the first main surface.

It should be noted that in the display devices according to the first to fifth embodiments, in the laser light source unit LD, R light, G light and B light are combined by a dichroic mirror. However, R light, G light and B light may be emitted into the light-guide unit, and combined therein.

It should be noted that in each of the display devices according to the first to sixth embodiments, the light source unit LS emits a polarized laser beam. However, the structure of each display device is not limited to this. The light source unit LS may be formed to emit a laser beam which is not polarized. Also, the illumination unit may be formed such that light is propagated in the light-guide unit while repeatedly reflected.

As explained above, according to each of the embodiments, a display device having a wider color gamut can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising;
a light source unit and a color filter unit,
wherein the light source unit comprises a laser light source unit including a red laser light source which emits a red laser beam, a green laser beam which emits a green laser beam, and a blue laser light source which emits a blue laser beam,
the color filter unit comprises a red filter film, a green filter film and a blue filter film,
a difference between a center emission wavelength of the green laser beam and that of the blue laser beam is within a range of 65 to 95 nm,
in the green filter film, a difference between a wavelength at a maximum light transmittance and a wavelength at a light transmittance of 10% on a shorter wavelength side is 70 nm or less,
in the green filter film, the wavelength at a maximum light transmittance is 520 to 540 nm,
the center emission wavelength of the blue laser beam is 450 to 480 nm,
a center emission wavelength of the blue laser beam is shorter than the wavelength at a light transmittance of 10% in the green filter film,
each of the filter films contains a color material which is a dye or a pigment,
the green filter film contains a green pigment and a yellow pigment,
the ratio by weight between the green pigment and the yellow pigment in the green filter film is within the range of 98:2 to 30:70,
the blue filter film contains a blue color material and a purple color material,
the ratio by weight between the blue color material and the purple color material in the blue filter film is within the range of 85:15 to 20:80, and
an emission intensity of the green laser beam is less than that of the red laser beam and that of the blue laser beam.

2. The display device of claim 1, wherein the center emission wavelength of the green laser beam is 525 to 550 nm.

3. The display device of claim 2, wherein in the green filter film, a light transmittance of a light having the center emission wavelength of the blue laser beam is 5% or less.

4. The display device of claim 2, wherein in the blue filter film, a difference between a wavelength at a maximum light transmittance and a wavelength at a light transmittance of 10% on the longer wavelength side is 70 nm or less.

5. The display device of claim 2, wherein a wavelength at a maximum light transmittance in the blue filter film is shorter than the center emission wavelength of the blue laser beam.

6. The display device of claim 1, wherein in the green filter film, a light transmittance of a light having the center emission wavelength of the blue laser beam is 5% or less.

7. The display device of claim 6, wherein a wavelength at a maximum light transmittance in the blue filter film is shorter than the center emission wavelength of the blue laser beam.

8. The display device of claim 1, wherein in the blue filter film, a difference between a wavelength at a maximum light transmittance and a wavelength at a light transmittance of 10% on the longer wavelength side is 70 nm or less.

9. The display device of claim 1, wherein a wavelength at a maximum light transmittance in the blue filter film is shorter than the center emission wavelength of the blue laser beam.

10. The display device of claim 1, wherein the light source unit emits polarized light, and the display device further comprises a light-guide unit which guides the polarized light toward the color filter unit while maintaining a polarization direction of the polarized light.

11. The display device of claim 10, wherein in the light-guide unit, an optical path length of the polarized light varies in accordance with a position where the polarized light is incident, the light source unit includes a first laser light source unit and a second laser light source unit each of which comprises a red laser light source, a green laser light source and a blue laser light source, an optical path length of a laser beam emitted from the first laser light source unit is longer than that of a laser beam emitted from the second laser light source unit, and an emission intensity of the laser beam emitted from the first laser light source unit is higher than that of the laser beam emitted from the second laser light source unit.

12. The display device of claim 1, wherein thicknesses of the blue filter film and the green filter film are larger than a thickness of the red filter film.

* * * * *